United States Patent [19]

Monchalin et al.

[11] Patent Number: 5,131,748
[45] Date of Patent: Jul. 21, 1992

[54] BROADBAND OPTICAL DETECTION OF TRANSIENT MOTION FROM A SCATTERING SURFACE BY TWO-WAVE MIXING IN A PHOTOREFRACTIVE CRYSTAL

[76] Inventors: Jean-Pierre Monchalin, 3840 Wilson, Montreal, Quebec, Canada H4A 2T8; Ros K. Ing, 60 Sacrée-Coeur St., #20, Longueuil, Quebec, Canada J4T 1A8

[21] Appl. No.: 712,438

[22] Filed: Jun. 10, 1991

[51] Int. Cl.$^5$ ............................................. G01B 9/02
[52] U.S. Cl. ..................... 356/349; 356/358; 73/657
[58] Field of Search .................. 356/349, 352, 358; 73/655, 657

[56] References Cited

U.S. PATENT DOCUMENTS 4,633,715  1/1987  Monchalin ............................ 356/358
4,966,459 10/1990  Monchalin ............................ 356/358

OTHER PUBLICATIONS

G. Hamel de Monchenault and J. P. Huignard, Journal of Applied Physics, vol. 63, No. 3, Feb. 1988, pp. 624–627.

Primary Examiner—Samuel A. Turner
Attorney, Agent, or Firm—Foley & Lardner

[57] ABSTRACT

A method and apparatus for optically detecting transient motion from a scattering surface. A laser beam having a predetermined frequency is directed onto such a surface to thereby scatter the laser beam and produce a scattered laser beam defining an optical wavefront and having an optical spectrum with a central peak at the laser frequency and a sideband on either side of the central peak. The scattered laser beam is caused to interfere inside a photorefractive crystal with a pump beam derived from the laser beam so as to form an index of refraction grating diffracting the pump beam into a reference beam having an optical wavefront substantially matching the wavefront of the scattered laser beam and an optical spectrum with a single peak at the laser frequency and no sidebands, whereby to produce at an exit face of the photorefractive crystal a transmitted scattered laser beam and a diffracted reference beam interfering with one another. The interfering beams at the exit face of the photorefractive crystal, or polarization components thereof, are at least temporarily out of phase, thereby obtaining an optical signal sensitive to phase perturbations produced by the transient motion, which optical signal is detected and converted into an electrical signal representative of the transient motion. The invention is particularly useful for detecting small surface formations or displacement of a material subjected to ultrasonic energy, enabling displacements ranging from a fraction of 1Å to a few hundred Å to be detected with a large étendue or light gathering efficiency and a broad frequency bandwidth extending from frequencies as low as 1 KHz, and even below.

22 Claims, 2 Drawing Sheets

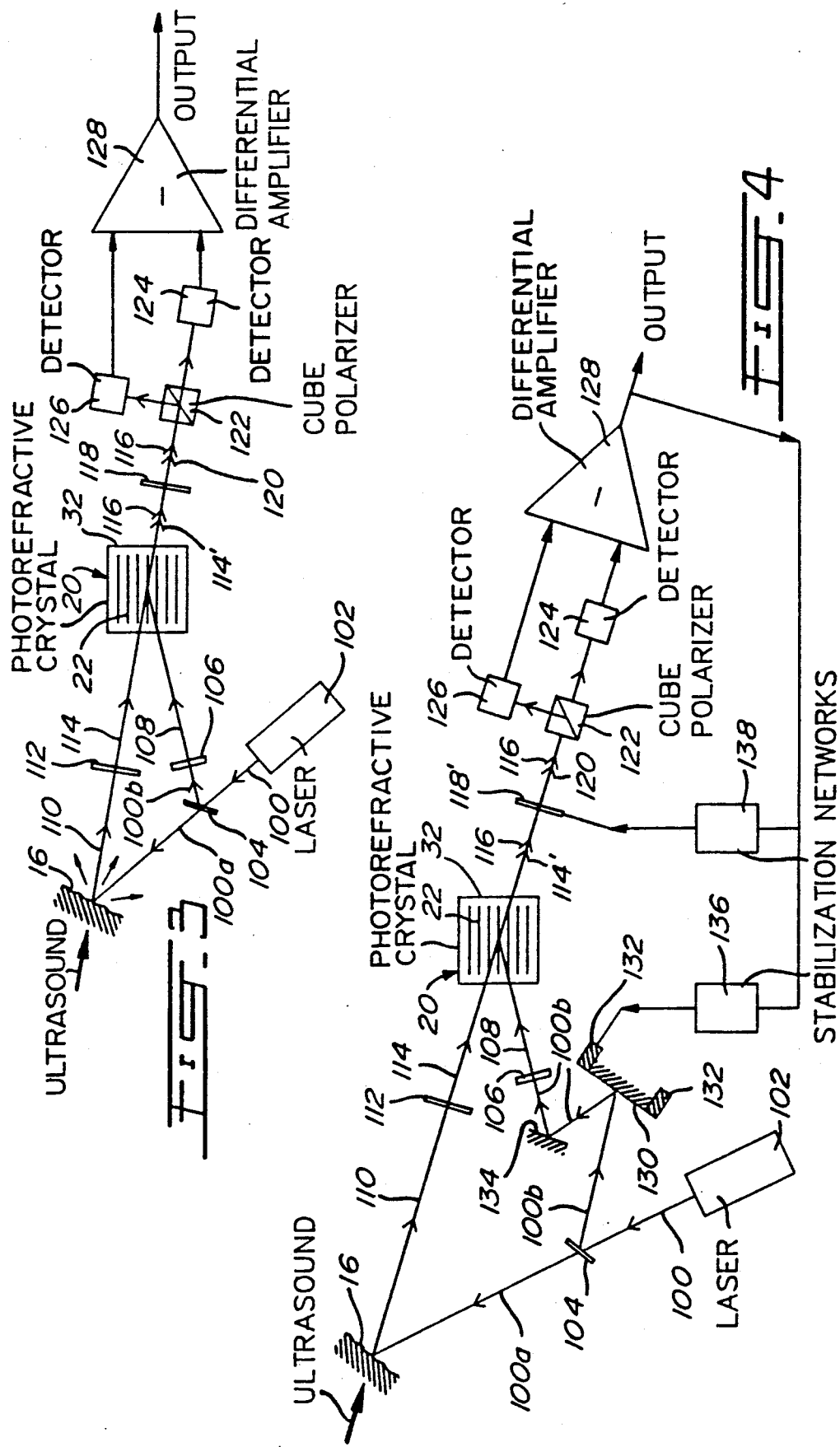

BROADBAND OPTICAL DETECTION OF TRANSIENT MOTION FROM A SCATTERING SURFACE BY TWO-WAVE MIXING IN A PHOTOREFRACTIVE CRYSTAL

BACKGROUND OF THE INVENTION

The present invention relates to a method and apparatus for optically detecting transient motion from a scattering surface. The invention is particularly directed toward detecting optical phase modulations such as those produced by low frequency ultrasound which is very useful for probing coarse microstructure materials.

The detection of the phase modulation or frequency modulation of an optical wave is important for various fields of application where optical beams are used to detect the motion of objects. This is the case of laser sensing of vibrations and laser detection of ultrasound and of transient body deformations such as those produced by a shock or on impact. Of particular interest for practical applications is the case where ultrasound or a shock wave is generated by a laser. In this case, a completely remote ultrasonic inspection system can be realised, permitting for example ultrasonic probing at elevated temperatures. A technique based on laser generation and optical detection can thus be advantageously used to inspect materials at high temperatures (such as all metals and ceramics) for process and quality control, to detect flaws as soon as they are created during processing, to measure production parameters (thickness, temperature, etc.) and to determine microstructural properties on-line (grain size, porosity, etc.).

Ultrasound is generally produced by a high power laser which heats locally the surface of a sample or workpiece to produce an acoustic source, and the phase or frequency modulation can be detected by means of a laser interferometer. Since in many cases, the modulation excursions to be detected are small, sensitivity is a prime concern. Adequate sensitivity requires a receiving demodulating means which has a large effective light gathering efficiency. The poor sensitivity of most of the optical detection systems known to date is one of the main reasons that has limited the practical evolution of such a technology to full commercial application.

Generally, the light gathering efficiency of an interferometric system is characterized by its étendue parameter (or throughput), defined as the product of its effective entrance aperture area by the solid angle limited by the rays of maximum inclination passing through the entrance aperture center and thus defining the field of view. The maximum inclination rays can be defined as those which produce a shift of the interference pattern by a quarter of a fringe. The importance of this étendue parameter stems from its invariance within the frame of geometrical optics. A large étendue permits to choose light collecting optics of large size, being only limited by cost and practical feasibility, and to detect surface motion over a large area.

Also of prime concern for many applications is the capability of providing a frequency response representative of the exact surface motion. This can only be achieved if the detecting technique has a broad frequency bandwidth.

The effect of transient motion upon a laser beam scattered by a surface can be described in three different and equivalent ways. It can be said that the surface motion produces a variable phase shift or a Doppler shift of the instantaneous frequency, or generates sidebands on both sides of the laser frequency. In the case of pulsed ultrasonic excitation, these sidebands are broadened.

In order to provide sensitive optical detection of ultrasound or transient motion over a broad bandwidth, it has already been proposed in U.S. Pat. No. 4,966,459 to derive from the laser beam scattered by the surface a reference beam having a wavefront substantially matching the wavefront of the scattered laser beam and to cause this reference beam, after stripping it from its sidebands, to interfere with the scattered laser beam whose frequency spectrum includes the carrier laser frequency and adjacent sidebands. The reference beam is stripped from its sidebands with an optical cavity of the confocal Fabry-Pérot type. Such an optical cavity, however, does not work very well at low ultrasonic frequencies since, at frequencies below 1 MHz, it cannot produce in practice a reference beam whose optical sidebands have been completely suppressed, while maintaining a large étendue or throughput.

SUMMARY OF THE INVENTION

It is therefore an object of the present invention to overcome the above drawback and to provide a method and apparatus for optically detecting transient motion from a scattering surface, having a large étendue as well as a broad frequency bandwidth which can extend from about 1 KHz, and even below, to a maximum frequency depending upon the frequency response of the device used for optical detection, for example, 100 MHz or higher.

According to one aspect of the invention, there is thus provided a method of optically detecting transient motion from a scattering surface, which comprises the steps of:

a) directing a laser beam having a predetermined frequency onto such a surface to thereby scatter the laser beam and produce a scattered laser beam during an optical wavefront and having an optical spectrum with a central peak at the laser frequency and a sideband on either side of the central peak;

b) causing the scattered laser beam to interfere inside a photorefractive crystal with a pump beam derived from the laser beam so as to form an index of refraction grating diffracting the pump beam into a reference beam having an optical wavefront substantially matching the wavefront of the scattered laser beam and an optical spectrum with a single peak at the laser frequency and no sidebands, whereby to produce at an exit face of the photorefractive crystal a transmitted scattered laser beam and a diffracted reference beam interfering with one another, while causing the interfering beams at the exit face of the photorefractive crystal, or polarization components thereof, to be at least temporarily out of phase to thereby obtain an optical signal sensitive to phase perturbations produced by the transient motion; and c) detecting the optical signal and converting same into an electrical signal representative of the transient motion.

The present invention also provides, in another aspect thereof, an apparatus for optically detecting transient motion from a scattering surface, which comprises laser source means for generating a laser beam having a predetermined frequency and directing same onto the aforesaid surface to thereby scatter the laser beam and produce a scattered laser beam defining an optical wavefront and having an optical spectrum with a central peak at the laser frequency and a sideband on either side of the central peak. A photorefractive crystal is arranged to collect the scattered laser beam. The apparatus further includes optical assembly means for deriving from the laser beam a pump beam and for causing the pump beam to interfere inside the photorefractive crystal with the scattered laser beam so as to form an index of refraction grating diffracting the pump beam into a reference beam having an optical wavefront substantially matching the wavefront of the scattered laser beam and an optical spectrum with a single peak at the laser frequency and no sidebands, whereby to produce at an exit face of the photorefractive crystal a transmitted scattered laser beam and a diffracted reference beam interfering with one another, while causing the interfering beams at the exit face of the photorefractive crystal, or polarization components thereof, to be at least temporarily out of phase to thereby obtain an optical signal sensitive to phase perturbations produced by the transient motion. A detector means is also provided for detecting the optical signal and converting same into an electrical signal representative of the transient motion.

Photorefractive crystals are optical materials in which electrical charges can be liberated from their initial site by photoexcitation and then trapped at another site, thus producing a light induced local electrical charge variation. This charge variation then creates an electric field which, in turn, by the electrooptic effect causes a variation of the index of refraction. When a signal beam generated by a laser source and a pump beam derived from the same laser source are passed through a photorefractive crystal, they interfere with one another inside the crystal to produce a light intensity grating pattern which, by the effect explained above, forms an index of refraction grating. As explained by G. Hamel de Monchenault and J.-P. Huignard in Journal of Applied Physics, Vol. 63, No. 3, Feb. 1988, pages 624–627, the teaching of which is incorporated herein by reference, this index of refraction grating diffracts the pump beam into a reference beam with a wavefront nearly identical to the wavefront of the signal beam. If a beam from the laser source is sent upon a scattering surface in transient motion and if the scattered laser beam is used as the signal beam sent onto the photorefractive crystal, the transmitted beam will retain the optical sidebands associated with the transient motion, whereas the diffracted reference beam will be sideband-free since it is derived from the laser source and since the index of refraction grating does not follow phase changes at the frequency corresponding to the transient motion, because of the slow response of the photorefractive crystal. Efficient diffraction efficiency requires a $\pi/2$ phase shift between the interference pattern of the signal and pump beams and the index of refraction grating pattern. This has the consequence that the beam scattered by the surface and transmitted by the crystal and the diffracted reference beam are in phase and therefore the sensitivity to a small phase shift such as caused by ultrasonic motion is nearly zero.

Applicant has found quite unexpectedly that small phase perturbations such as those produced by a transient motion from a scattering surface can still be detected with such a photorefractive scheme if the interfering beams or polarization components thereof at the output of the photorefractive crystal are at least temporarily out of phase. Such a condition can be fulfilled, for example, by temporarily phase shifting the pump beam or the beam sent onto the surface for a time duration sufficiently long to capture the signal of interest, but sufficiently short to avoid affecting the index of refraction grating. Optimum phase shift between the interfering beams is generally $\pm\pi/2+2\pi n$, n being an integer (i.e. quadrature condition). An other possibility consists in adding to one of the beams, either the pump beam or the beam sent onto the surface, an additional beam at a different frequency so as to result in one of the interfering components at the exit face of the crystal having a continuously varying phase. Still a third alternative consists in realizing that light can be polarized and adjusting phase shift between polarization components which contribute to the index of refraction grating formation and components which do not contribute to it, to the optimum value mentioned above of $\pm\pi/2+2\pi n$.

By the expression "transient motion" is meant a motion having non-zero acceleration. Such an expression thus includes all oscillating motions, but excludes motions of constant velocities.

The invention is particularly useful for detecting small surface deformations or displacements of a material subjected to ultrasonic energy, enabling displacements ranging from a fraction of 1 Å to a few hundred Å to be detected with a large étendue or light gathering efficiency and a broad frequency bandwidth extending from frequencies as low as 1 KHz, and even below.

BRIEF DESCRIPTION OF THE DRAWINGS

Further features and advantages of the invention will become more readily apparent from the following description of preferred embodiments as illustrated by way of examples in the accompanying drawings, in which:

FIG. 3 is a further schematic diagram illustrating a third embodiment of the invention, in which the scattered laser beam and pump beam are polarized; and FIG. 4 schematically illustrates an improvement of the embodiment shown in FIG. 3, incorporating stabilization networks.

DESCRIPTION OF PREFERRED EMBODIMENTS

Figure 1:
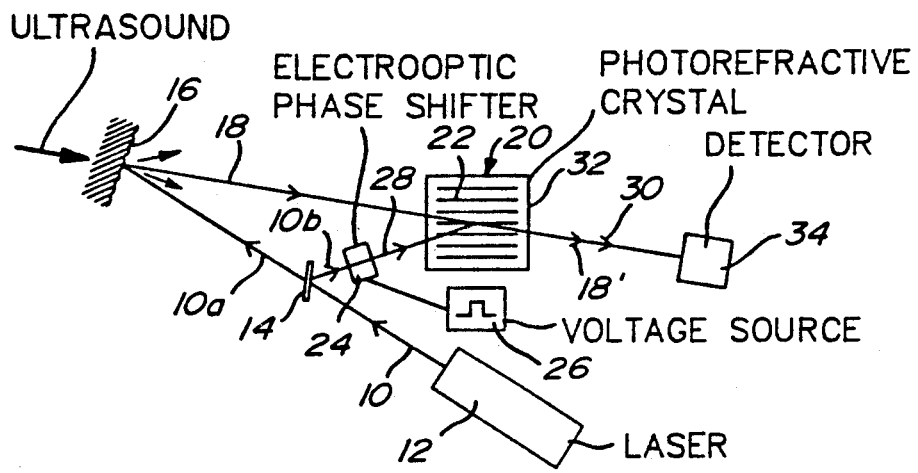
FIG. 1 is a schematic diagram illustrating a first embodiment according to the invention, in which the pump beam is temporarily phase shifted.

FIG. 1 illustrates a first preferred embodiment according to the invention, in which the pump beam is given a transient phase shift of $\pm\pi/2+2\pi n$, n being an integer, during a time sufficiently long to capture the surface transient motion, but sufficiently short to avoid affecting the refractive index grating. As shown, a laser beam 10 generated by the laser source 12 is divided by a beam splitter 14 into two beam portions 10a and 10b, the beam portion 10a being directed onto the surface 16 of a material or workpiece subjected to ultrasonic energy. The ultrasonic displacement or transient motion of the surface 16 probed by the laser beam portion 10a can be produced by an ultrasonic piezoelectric transducer or other means such as electrical discharge, projectile impact or high intensity laser pulse; it can also occur naturally in a strained material. As the laser beam portion 10a impinges on the surface 16, it is scattered by the surface, the scattered laser beam 18 thus produced having an optical spectrum with a central peak at the laser frequency $F_L$ and a sideband on either side of the central peak. The beam portion 10b which is used as a pump beam is directed onto a photorefractive crystal 20 where it interferes with the scattered laser beam 18 to form an index of refraction grating 22. In order to impact to the pump beam 10b the desired transient phase shift, the pump beam 10b is passed through an electrooptic phase shifter 24 which is electrically driven by a voltage source 26 synchronized with the source producing the transient surface motion or the ultrasonic displacement, to produce a phase shifted pump beam 28 directed onto the photorefractive crystal 20. The index of refraction grating 22 diffracts the phase shifted pump beam 28 into a sideband-free reference beam 30 which has an optical wavefront substantially matching the wavefront of the scattered laser beam 18 and which is temporarily out of phase with the transmitted scattered laser beam 18'. The transmitted scattered laser beam 18' and the diffracted reference beam 30 interfere with one another as they emerge from the exit face 32 of the photorefractive crystal 20, to produce an optical signal which is detected by the detector 34 and converted into an electrical signal representative of the transient motion. Prior to electrical excitation of the electrooptic phase shifter 26, the interfering beams 18' and 30 at the exit face 32 of the photorefractive crystal 20 are in phase.

Before the motion to be detected starts, the voltage source 26 applies a voltage on the electrooptic phase shifter 24 which produces a phase shift of $\pm\pi/2 + 2\pi n$, which is immediately transferred upon the diffracted reference beam 30, since the photorefractive crystal 20 being slow the refractive index grating 22 does not have time to readjust itself. The diffracted reference beam 30 has from thereon the proper phase relation with respect to the transmitted scattered laser beam 18' to detect efficiently the small phase perturbations produced upon it by the transient surface motion. The voltage applied to the electrooptic phase shifter 24 is then turned off after capturing the signal of interest, in practice after a time less than 1 msec., 10–50 $\mu$sec. being typical for ultrasound detection. Since photorefractive crystals have response times typically longer than 1 msec., this transient phase perturbation generally does not affect the index of refraction grating, especially if it is not repeated too often. Alternatively, the transient $\pm\pi/2 + 2\pi n$ phase shift can be applied on the beam sent onto the surface, instead of being applied to the pump beam; in this case, the scattered laser beam is phase shifted such that the transmitted scattered laser beam is temporarily out of phase with the diffracted reference beam.

Figure 2:
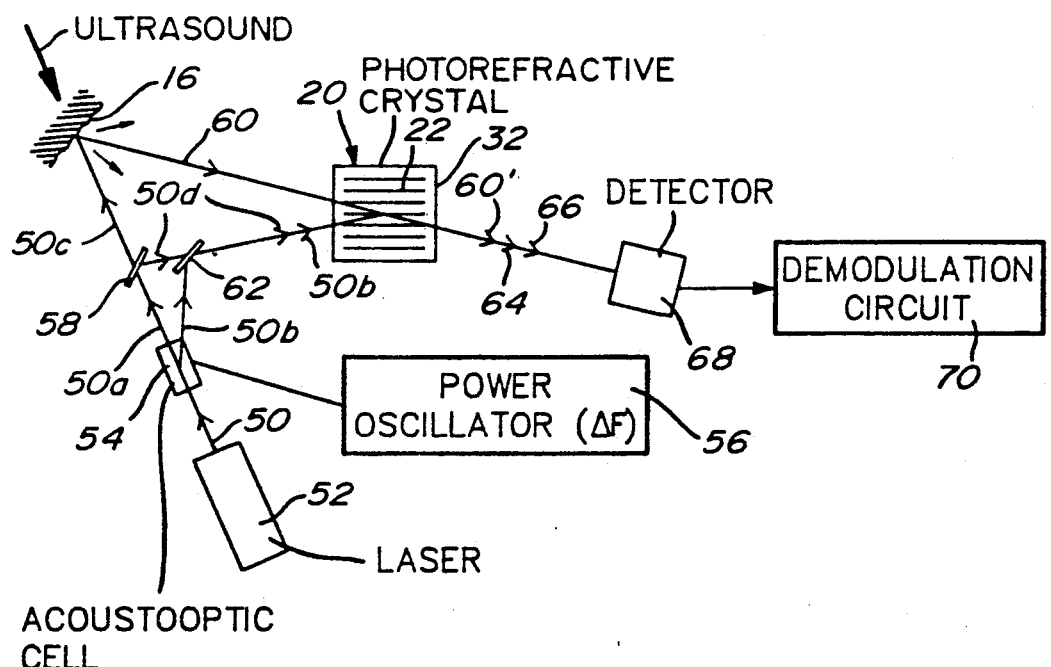
FIG. 2 is another schematic diagram illustrating a second embodiment according to the invention, in which a dual frequency pump beam is sent onto the photorefractive crystal.

FIG. 2 illustrates a second preferred embodiment of the invention, in which a constantly varying phase shift is provided between the transmitted scattered laser beam and the diffracted reference beam. This phase shift varies as $2\pi\Delta Ft$, $\Delta F$ being a radio frequency. As shown, the laser beam 50 generated by the laser source 52 of frequency $F_L$ is sent through an acoustooptic cell 54 driven at frequency AF by a power RF oscillator 56 tuned to the frequency $\Delta F$. A fraction of the light goes through the acoustooptic cell 54 as a beam portion 50a and the remaining fraction of light is angularly deflected as a beam portion 50b which is frequency shifted by $\Delta F$. The undeflected and unshifted beam portion 50a of frequency $F_L$ is sent onto a beam splitter 58 where it is further divided into two beam portions 50c and 50d, the beam portion 50c being directed onto the probed surface 16. As in the previous embodiment, the beam portion 50d is used as a pump beam and is directed onto the photorefractive crystal 20 where it interferes with the beam 60 scattered by the surface 16, to produce the index of refraction grating 22.

A beam mixer 62 is arranged in the optical paths of the beams 50b and 50d to superimpose the frequency shifted beam 50b at frequency $F_L + \Delta F$ on the pump beam 50d at frequency $F_L$ so as to produce a dual frequency pump beam 50b,50d directed onto the photorefractive crystal 20. The index of refraction grating 22 diffracts the pump beam 50d into a reference beam 64 at frequency $F_L$, which is in phase with the transmitted scattered laser beam 60' and mixed colinearly therewith; the reference beam 64 also has an optical wavefront matching the wavefront of the scattered laser beam 60. The frequency shifted beam 50b produces upon interference with the scattered laser beam 60 at frequency $F_L$ a rapidly moving fringe grating which gives a near uniform change of index of refraction since the variation is too fast for the photorefractive material. This frequency shifted beam 50b is then diffracted by the stationary index of refraction grating 22 formed by the pump beam 50d and the scattered laser beam 60, into an additional reference beam 66 at frequency $F_L + \Delta F$. The diffracted reference beam 66 is superimposed on the transmitted scattered laser beam 60', has an optical wavefront matching the wavefront of the scattered laser beam 60, but it is frequency offset by $\Delta F$, which means that it is continuously phase shifted by $2\pi\Delta Ft$.

The transmitted scattered laser beam 60' at frequency $F_L$, the diffracted reference beam 64 at frequency $F_L$ and the additional diffracted reference beam 66 at frequency $F_L + \Delta F$, which emerge from the exit face 32 of the photorefractive crystal 20, interfere with one another to produce an optical signal which is detected by the detector 68 and which varies at radio frequency $\Delta F$ and has a transient phase shift in proportion to the surface transient motion. In order to extract the phase shift from such a radio frequency signal, a demodulation circuit 70 such as described in U.S. Pat. No. 4,633,715 can be used.

Alternatively, the frequency shifted beam 50b can be superimposed on the beam portion 50c to produce a dual frequency laser beam directed onto the probed surface 16, thereby producing at the exit face 32 of the photorefractive crystal 20 an additional transmitted scattered laser beam at frequency $F_L + \Delta F$. A radio frequency signal at $\Delta F$ with a transient phase shift representative of the surface motion is similarly produced.

A third preferred embodiment is illustrated in FIG. 3. This embodiment is based on the use of two polarizations of the interfering transmitted scattered laser beam and diffracted reference beam with now a constant phase shift in order to provide the quadrature condition for optimum detection of the surface transient motion. As shown, the laser beam 100 from the laser source 102 is divided by a beam splitter 104 into beam portions 100a and 100b, the beam portion 100a being directed onto the probed surface 16. The beam portion 100b which is used as a pump beam is sent through a polarizer 106 oriented along a predetermined direction (e.g. the X direction) to produce a polarized pump beam 108 directed onto the photorefractive crystal 20. The scattered laser beam 110 is passed through a polarizer 112 oriented at 45° with respect to the X and Y directions, where the Y-direction is perpendicular to the X direction (for example in FIG. 3, X may lie in the plane of the figure and Y may be perpendicular to it), to produce a polarized scattered laser beam 114 which is collected and transmitted by the photorefractive crystal 20. Thus, the scattered laser beam 114 incident onto the photorefractive crystal 20 has been given two polarization components, one parallel with that of the polarized pump beam 108 (along X) and the other one perpendicular to it (along Y). The index of refraction grating 22 inside the photorefractive crystal 20 is only produced by the two interfering polarization components of the polarized pump beam 108 and polarized scattered laser beam 114 (i.e. the polarization components along X). Assuming that the X polarization corresponds to a plane of symmetry of the crystal 20 (e.g. X could be in the plane of the C-axis), the diffracted reference beam 116 emerging from the exit face 32 of the crystal 20 has only one polarization component, whereas the transmitted scattered laser beam 114' has X and Y polarization components.

The transmitted scattered laser beam 114' and diffracted reference beam 116 which emerge from the exit face 32 of the photorefractive crystal 20 are passed through a retardation plate 118 (i.e. a birefringent plate) with neutral axis oriented parallel to the X and Y directions. The retardation of the plate 118 is such that, when combined with the retardation introduced by the photorefractive crystal 20, an overall phase shift of $\pm \pi/2 + 2\pi n$ is produced between the Y polarization component of the transmitted scattered laser beam 120 exiting the retardation plate and the X polarization components of the diffracted reference beam 116 and transmitted scattered laser beam 120; these two X polarization components are in phase as mentioned previously. The beams 116 and 120 are then sent onto a combination of two perpendicular polarizers oriented at 45° with respect to the X and Y directions, which in practice, are realized by using a single cube polarizer 122. The X and Y polarization components of the diffracted reference beam 116 and transmitted scattered laser beam 120 interfere along these two polarizer directions. As shown in FIG. 3, detector 124 receives the light polarized along one of these directions and detector 126 receives the light polarized along the other direction. The signals of these two detectors 124 and 126 are sent to a differential amplifier 128 which gives a signal representative of the surface transient motion. This combination of two detectors receiving interference signals from two perpendicular directions followed by a differential amplifier has the advantage to double the signal and to eliminate up to a large extent intensity fluctuations affecting the laser source 102, as it will become apparent from the mathematical derivation given hereinbelow.

The principle of operation of the embodiment illustrated in FIG. 3 can be explained as follows.

By using complex notations, the light amplitudes along the two polarization directions X and Y can be written to be proportional to:

$$Along\ x:\ Se^{i\Delta\phi} + R = S(\cos \Delta\phi + i \sin \Delta\phi) + R \quad (1a)$$

$$Along\ y:\ Se^{i(\Delta\phi \pm \pi/2)} = \pm iS(\cos \Delta\phi + i \sin \Delta\phi) \quad (1b)$$

where R and S are the amplitudes of the diffracted reference beam and transmitted scattered laser beam, respectively (the transmitted scattered laser beam is assumed to be polarized at 45° ahead of the photorefractive crystal giving equal polarization components along X and Y), and $\Delta\phi$ represents the rapid phase variation of the scattered laser beam caused by the transient surface motion or ultrasonic motion which is faster than the photorefractive crystal response time. At the output of a polarizer oriented at 45° to the X and Y directions, the light intensity signal is then proportional to:

$$R^2 + 2S^2(\cos^2 \Delta\phi + \sin^2 \Delta\phi) + 2RS(\cos \Delta\phi \pm \sin \Delta\phi) \quad (2)$$

where the $\pm$ sign depends on the configuration of the 45° direction with respect to the X and Y axis. The + sign applies to one of the polarization direction given by the cube polarizer 122 whereas the − sign applies to the other direction. The intensity signal given by eq. (2) has a variation linear in $\Delta\phi$ when $\Delta\phi$ is small, which is generally the case of the detection of ultrasonic or other transient surface motion. The detected intensity can therefore be written as:

$$R^2 + 2S^2 + 2RS \pm 2\ RS\ \Delta\phi. \quad (3)$$

If two perpendicular polarizers are used at the output with corresponding detectors 124 and 126, the signals of which are sent to the differential amplifier 128, it then results at the output of the differential amplifier 128 a doubled signal equal to:

$$4\ RS\ \Delta\phi \quad (4)$$

Intensity fluctuations which affect the pump beam and the transmitted scattered beam which may originate from the laser source and produce their effect through the $R^2 + 2S^2 + 2Rs$ term of eq. (3) above, are then eliminated up to a large extent.

In practice, the embodiment illustrated in FIG. 3 requires further modifications which are shown in FIG. 4, in order to operate reliably with most presently existing photorefractive crystals which have a rather slow response time. This response time is typically longer than 1 msec. and could even be as long as 1 sec., and even more, with a crystal such as a barium titanate crystal. In this case, ambient vibrations constantly move the interference pattern between the pump beam and the scattered laser beam inside the crystal so as to prevent the formation of the index of refraction grating. Another limitation of the embodiment of FIG. 3 is the difficulty to find the proper retardation plate 118 providing the required overall phase shift, since in order to cut this plate to the desired thickness giving the desired retardation, the phase shift introduced by the photorefractive crystal 20 has to be precisely known. Furthermore, during the formation of the index of refraction grating 22 the phase shift introduced by the crystal 20 is changing. These limitations are circumvented by the modifications shown in FIG. 4.

Referring to FIG. 4, a first modification consists in breaking the optical path of the pump beam 100b in such a way that it is reflected by a mirror 130 mounted on a piezoelectric pusher 132 before being sent onto the photorefractive crystal 20 by another mirror 134. As shown, the output of the differential amplifier 128 is fed to a first stabilization network 136 which drives the piezoelectric pusher 132. Stabilization network 136 drives this piezoelectric pusher 132 and the mirror 130 mounted upon it to give a constant path length difference between the pump beam 100b,108 and scattered laser beam 110. It then follows a continuous formation of the index of refraction grating 22 inside the crystal 20. The bandwidth of the stabilization network 136 and of the piezoelectric pusher 132 extends over the range of vibration frequencies to be compensated and above the frequency cut-off of the crystal response. Such a compensation scheme which takes its input from the differential ouput of detectors 124 and 126 is justified by noting that eqs. (1), (2), (3) and (4) apply with $\Delta\phi$ representing the phase shift produced by vibrations when the crystal is too slow to respond to phase shifts induced at vibration frequencies. The output of the differential amplifier 128 therefore provides the desired error signal to drive the stabilization network 136. Alternatively, vibration compensation can be implemented on the scattered beam path, instead of the pump beam path.

A second modification consists in replacing the fixed value retardation plate 118 shown in FIG. 3 by a variable retardation plate 118', the variation of which is electrically controlled by a second stabilization network 138 taking its input from the output of differential amplifier 128. The stabilization network 138 drives the variable retardation plate 118' in such a way that the overall phase shift between the X and Y polarization components is all the time $\pm\pi/2+2\pi n$. When this is the case, eqs. (1), (2) and (3) apply and detectors 124 and 126 give the same DC level which results in a differential output which is zero at DC. This is further justified by a detailed analysis which shows that this differential output provides the correct error signal for phase shift adjustment. The bandwidth of the stabilization network 138 and of the variable retardation plate 118' ranges from DC to the frequency cut-off of the crystal response. Therefore, the two stabilization loops cover, as it should be, adjacent but nonoverlapping frequency ranges. A suitable variable retardation plate for use as plate 118' can be made with an electrooptic crystal or a liquid crystal retarder such as the one manufactured by Meadowlark Optics in Longmont, Colo., USA.

We claim:

1. A method of optically detecting transient motion from a scattering surface, which comprises the steps of:
   a) directing a laser beam having a predetermined frequency onto said surface to thereby scatter said laser beam and produce a scattered laser beam defining an optical wavefront and having an optical spectrum with a central peak at said predetermined frequency and a sideband on either side of said central peak;
   b) causing said scattered laser beam to interfere inside a photorefractive crystal with a pump beam derived from the laser beam so as to form an index of refraction grating diffracting said pump beam into a reference beam having an optical wavefront substantially matching the wavefront of said scattered laser beam and an optical spectrum with a single peak at said predetermined frequency and no sidebands, whereby to produce at an exit face of said photorefractive crystal a transmitted scattered laser beam and a diffracted reference beam interfering with one another, while causing the interfering beams at the exit face of said photorefractive crystal, or polarization components thereof, to be at least temporarily out of phase to thereby obtain an optical signal sensitive to phase perturbations produced by said transient motion; and
   c) detecting said optical signal and converting same into an electrical signal representative of said transient motion.

2. A method according to claim 1, wherein step (b) is carried out by dividing said laser beam into first and second beam portions, said first beam portion being directed onto said surface, phase shifting said second beam portion during a time sufficiently long to capture said transient motion, but sufficiently short to avoid affecting said index of refraction grating, to produce a phase shifted pump beam and directing said phase shifted pump beam onto said photorefractive crystal, whereby said diffracted reference beam is temporarily out of phase with said transmitted scattered laser beam.

3. A method according to claim 2, wherein said second beam portion is phase shifted by $\pm\pi/2+2\pi n$, n being an integer.

4. A method according to claim 1, wherein step (b) is carried out by dividing said laser beam into first and second beam portions, said second beam portion defining said pump beam, directing said pump beam onto said photorefractive crystal, phase shifting said first beam portion during a time sufficiently long to capture said transient motion, but sufficiently short to avoid affecting said index of refraction grating, to produce a phase shifted beam portion and directing said phase shifted beam portion onto said surface to produce a phase shifted scattered laser beam which is collected and transmitted by said photorefractive crystal, whereby said transmitted scattered laser beam is temporarily out of phase with said diffracted reference beam.

5. A method according to claim 4, wherein said first beam portion is phase shifted by $\pm\pi/2+2\pi n$, n being an integer.

6. A method according to claim 1, wherein step (b) is carried out by dividing said laser beam into first and second beam portions, said first beam portion being directed onto said surface, deriving from said laser beam another beam, frequency shifting said other beam to produce a frequency shifted beam, superimposing said frequency shifted beam on said second beam portion to produce a dual frequency pump beam and directing said dual frequency pump beam onto said photorefractive crystal, thereby producing at the exit face of said photorefractive crystal an additional diffracted reference beam which constantly varies in phase relative to said transmitted scattered laser beam and said diffracted reference beam.

7. A method according to claim 1, wherein step (b) is carried out by dividing said laser beam into first and second beam portions with said second beam portion defining said pump beam, directing said pump beam onto said photorefractive crystal, deriving from said laser beam another beam, frequency shifting said other beam to produce a frequency shifted beam, superimposing said frequency shifted beam on said first beam portion to produce a dual frequency laser beam and directing said dual frequency laser beam onto said surface to produce a dual frequency scattered laser beam which is collected and transmitted by said photorefractive crystal, thereby producing at the exit face of said photorefractive crystal an additional transmitted scattered laser beam which constantly varies in phase relative to said transmitted scattered laser beam and said diffracted reference beam.

8. A method according to claim 1, wherein step (b) is carried out by dividing said laser beam into first and second beam portions with said second beam portion defining said pump beam, said first beam portion being directed onto said surface, polarizing said scattered laser beam to produce a polarized scattered laser beam which is collected and transmitted by said photorefractive crystal, polarizing said pump beam to produce a polarized pump beam and directing same onto said photorefractive crystal, said scattered laser beam and said pump beam being polarized in a way such that at the exit face of said photorefractive crystal said diffracted reference beam has a single polarization component and said transmitted scattered laser beam has two polarization components with a first polarization component parallel with said single polarization component and a second polarization component perpendicular to said single polarization component, inducing an overall phase shift between said first and second polarization components, and causing said single polarization component and said first and second polarization components to interfere with one another, thereby providing said optical signal.

9. A method according to claim 8, wherein said overall phase shift is equal to about $\pm\pi/2 + 2\pi n$, n being an integer.

10. A method according to claim 8, wherein said pump beam is stabilized with respect to said scattered laser beam so as to produce a stable interference pattern inside said photorefractive crystal.

11. A method according to claim 10, wherein phase variations during formation of said index of refraction grating are compensated so as to provide a stable overall phase shift between said first and second polarization components.

12. An apparatus for optically detecting transient motion from a scattering surface, which comprises:
  laser source means for generating a laser beam having a predetermined frequency and directing same onto said surface to thereby scatter said laser beam and produce a scattered laser beam defining an optical wavefront and having an optical spectrum with a central peak at said predetermined frequency and a sideband on either side of said central peak;
  a photorefractive crystal arranged to collect said scattered laser beam;
  optical assembly means for deriving from the laser beam a pump beam and for causing said pump beam to interfere inside said photorefractive crystal with said scattered laser beam so as to form an index of refraction grating diffracting said pump beam into a reference beam having an optical wavefront substantially matching the wavefront of said scattered laser beam and an optical spectrum with a single peak at said predetermined frequency and no sidebands, whereby to produce at an exit face of said photorefractive crystal a transmitted scattered laser beam and a diffracted reference beam interfering with one another, while causing the interfering beams at the exit face of said photorefractive crystal, or polarization components thereof, to be at least temporarily out of phase to thereby obtain an optical signal sensitive to phase perturbations produced by said transient motion; and
  detector means for detecting said optical signal and converting same into an electrical signal representative of said transient motion.

13. An apparatus according to claim 12, wherein said optical assembly means comprises beam splitting means for dividing said laser beam into first and second beam portions and for directing said first beam portion onto said surface and said second beam portion onto said photorefractive crystal, and electrooptic phase shifter means for phase shifting said second beam portion during a time sufficiently long to capture said transient motion, but sufficiently short to avoid affecting said index of refraction grating, to produce a phase shifted pump beam directed onto said photorefractive crystal, whereby said diffracted reference beam is temporarily out of phase with said transmitted scattered laser beam.

14. An apparatus according to claim 13, wherein said electrooptic phase shifter means is operative to phase shift said second beam portion by $\pm\pi/2 + 2\pi n$, n being an integer.

15. An apparatus according to claim 12, wherein said optical assembly means comprises beam splitting means for dividing said laser beam into first and second beam portions with said second beam portion defining said pump beam and for directing said first beam portion onto said surface and said pump beam onto said photorefractive crystal, and electrooptic phase shifter means for phase shifting said first beam portion during a time sufficiently long to capture said transient motion, but sufficiently short to avoid affecting said index of refraction grating, to produce a phase shifted beam portion directed onto said surface, thereby to produce a phase shifted scattered laser beam which is collected and transmitted by said photorefractive crystal, whereby said transmitted scattered laser beam is temporarily out of phase with said diffracted reference beam.

16. An apparatus according to claim 15, wherein said electrooptic phase shifter means is operative to phase shift said first beam portion by $\pm\pi/2 + 2\pi n$, n being an integer.

17. An apparatus according to claim 12, wherein said optical assembly means comprises beam splitting means for dividing said laser beam into first and second beam portions and for directing said first beam portion onto said surface and said second beam portion onto said photorefractive crystal, acoustooptic frequency shifter means for deriving from said laser beam another beam and for frequency shifting said other beam to produce a frequency shifted beam, and beam mixing means for superimposing said frequency shifted beam on said second beam portion to produce a dual frequency pump beam directed onto said photorefractive crystal, thereby to produce at the exit face of said photorefractive crystal an additional diffracted reference beam which constantly varies in phase relative to said transmitted scattered laser beam and said diffracted reference beam.

18. An apparatus according to claim 12, wherein said optical assembly means comprises beam splitting means for dividing said laser beam into first and second beam portions with said second beam portion defining said pump beam and for directing said first beam portion onto said surface and said pump beam onto said photorefractive crystal, acousto-optic frequency shifter means for deriving from said laser beam another beam and for frequency shifting said other beam to produce a frequency shifted beam, and beam mixing means for superimposing said frequency shifted beam on said first beam portion to produce a dual frequency laser beam directed onto said surface, thereby to produce a dual frequency scattered laser beam which is collected and transmitted by said photorefractive crystal, and produce at the exit face of said photorefractive crystal an additional transmitted scattered laser beam which constantly varies in phase relative to said transmitted scattered laser beam and said diffracted reference beam.

19. An apparatus according to claim 12, wherein said optical assembly means comprises beam splitting means for dividing said laser beam into first and second beam portions with said second beam portions defining said pump beam and for directing said first beam portion onto said surface and said pump beam onto said photorefractive crystal, first polarization means for polarizing said scattered laser beam to produce a polarized scattered laser beam which is collected and transmitted by said photorefractive crystal, second polarization means for polarizing said pump beam to produce a polarized pump beam directed onto said photorefractive crystal, said first and second polarization means being operative to polarize said scattered laser beam and said pump beam in a way such that at the exit face of said photorefractive crystal said diffracted reference beam has a single polarization component and said transmitted scattered laser beam has two polarization components with a first polarization component parallel with said single polarization component and a second polarization component perpendicular to said single polarization component, phase retardation means for inducing an overall phase shift between said first and second polarization components, and third polarization means for causing said single polarization component and said first and second polarization components to interfere with one another, thereby to provide said optical signal.

20. An apparatus according to claim 19, wherein said phase retardtion means is operative to induce an overall phase shift equal to about $\pm\pi/2 + 2\pi n$, n being an integer.

21. An apparatus according to claim 19, further including first stabilization means for stabilizing said pump beam with respect to said scattered laser beam so as to produce a stable interference pattern inside said photorefractive crystal.

22. An apparatus according to claim 21, further including second stabilization means for compensating phase variations during formation of said index of refraction grating so as to provide a stable overall phase shift between said first and second polarization components.

* * * * *